United States Patent Office 2,861,102
Patented Nov. 18, 1958

2,861,102

CONTINUOUS PROCESS FOR PRODUCING α-ETHYLCINNAMIC ACID

James E. Huff and Rodney D. Moss, Midland, Mich., assignors to The Dow Chemical Company, Midland, Mich., a corporation of Delaware No Drawing. Application August 30, 1956
Serial No. 606,958

8 Claims. (Cl. 260—523)

This invention relates to processes for the continuous hypochlorite cleavage of 3-benzylidene-2-pentanone whereby α-ethylcinnamic acid is produced.

An object of this invention is to provide processes for the rapid, continuous, and substantially quantitative conversion of 3-benzylidene-2-pentanone into α-ethylcinnamic acid. Other objects will appear hereinafter.

α-Ethylcinnamic acid is an old and well known compound having many uses, one of the more important ones being in the synthesis of 5-ethyl-dihydro-6-phenyl-(2H)-1,3-thiazine-2,4-(3H)-dione.

The alkaline hprochlorite cleavage of methyl ketones is an old and widely used process but heretofore has been used only as an inefficient batch process suitable only for the small scale production of high-cost specialty products.

According to the invention, the oxidation of 3-benzylidene-2-pentanone is carried out continuously, on any desired scale, with a reaction time of only a few minutes, and with substantially quantitative yields of high-purity α-ethylcinnamic acid or its sodium salt, by passing a cold, alkaline aqueous solution of alkali hypochlorite and the ketone in a mole ratio of at least about 4:1, into a reactor maintained at about 80 to 100° C., preferably at 95 to 98°, and continuously withdrawing the reaction product. The latter consists essentially of an aqueous solution of alkali α-ethylcinnamate and the by-products of the process. The alkali α-ethylcinnamate can be recovered as such by cooling the effluent from the reactor, whereby the product crystallizes, or it can be converted to the free acid by acidifying the effluent stream with any suitable acid, such as sulfuric acid or hydrochloric acid, whereby the product is precipitated as substantially pure α-ethylcinnamic acid.

In order to achieve rapid and complete reaction in the process, it is essential that the hypochlorite solution be strongly alkaline, that is, it should have a pH of at least 10, and preferably about 12. Since the reaction is strongly exothermic, and since the hypochlorite solution may be somewhat unstable at higher temperatures, it is desirable that the hypochlorite solution be fed to the reactor at a temperature not exceeding about 15° C., and preferably not exceeding 10°. Even when the reagents are chilled before they enter the reactor, it is generally necessary to provide means for cooling the reactor, or at least that part of it in which the most vigorous reaction occurs, in order to achieve maximum production capacity in it. If the reactor is in the preferred form of a vertical tower, in which the reagents are fed in at the bottom and the product solution is withdrawn overhead, cooling may be conveniently provided either by jacketing the lower portion of the tower or by cooling coils immersed in the reaction mixture.

Since the ketone and the aqueous hypochlorite reagents are immiscible, it is essential that they be intimately mixed in the reaction zone. This can be achieved by vigorous stirring, either alone or, preferably, in conjunction with the use of a small amount of an emulsifying agent. Neither the identity nor the amount of the emulsifying agent is critical. Any emulsifier known to be effective in alkaline oxidizing solutions may be used in any effective concentration. We have found that the alkylarylsulfonate type of emulsifier is satisfactory when used at the rate of about 5 g. per gram mole of the ketone reagent.

The practice of the invention is illustrated by the following example:

The reactor used was a vertical cylinder, 2" x 12", fitted with inlets at its bottom and an outlet at its top, a thermometer well and an agitator. The latter, designed to promote local and radial mixing with a minimum of vertical mixing, consisted of an axial shaft on which was mounted a series of spaced circular discs. Between these rotating discs similar fixed discs were attached to the reactor wall. Thus, the reaction mixture, in rising through the reactor met alternating rotating and fixed discs. The stirrer was operated at about 400 to 650 R. P. M. The lower half of the reactor was jacketed so that cooling water could be circulated around the reactor.

Two reactant streams were pumped continuously into the bottom of the reactor: (a) 3-benzylidene-2-pentanone containing 5 g. per mol of Nacconol NRSF (a sodium alkylarylsulfonate type emulsifying agent known to be stable and effective in alkaline oxidizing solutions) and, (b) a 15 percent aqueous solution of sodium hypochlorite containing sufficient sodium hydroxide to make its pH about 12, the solution being at a temperature of 10° C.

The two solutions were pumped at such rates that 4.5 m. of hypochlorite were used with each mol of ketone and the residence time in the reactor was 9 minutes. The temperature in the reactor was held at 95 to 98° C. by circulating cooling water in the reactor jacket.

When the effluent stream from the reactor was cooled to room temperature a substantially quantitative yield (95 to 100 percent) of pure sodium α-ethylcinnamate crystallized and was recovered by filtration. Alternatively, the hot effluent stream could be acidified with sulfuric or hydrochloric acid, thus causing the precipitation of pure α-ethylcinnamic acid in equally high yield.

The reactor was operated at other temperatures in the range of 80 to 100° C., slower reaction being obtained at the lower temperatures.

When less than about 4 mols of hypochlorite per mol of ketone were used, a lower yield and a less pure product were obtained. The use of more than 4.5 mols of hypochlorite was harmless but wasteful.

Substantially quantitative yields of α-ethylcinnamic acid were obtained when the process was conducted so that the residence time of the reaction mixture in the reactor was varied from about 5 to 35 minutes.

It is apparent that other types of reactors than that used in the above example could be used in the process. One alternative form is a long, narrow tube or pipe, which might be coiled for compactness and immersed in a temperature control bath, through which the mixture of reactants would be pumped at a rate sufficient to produce efficient mixing and heat exchange by turbulent flow, thus eliminating the need for an agitator.

Instead of the sodium hypochlorite used in the above example, other alkali hypochlorites, such as potassium or lithium hypochlorite, may be used with similar results. Because of its lower cost, however, we prefer to use the sodium salt.

We claim:
1. A continuous process comprising intimately and continuously mixing in a reaction zone the reagents (a) one molecular equivalent of 3-benzylidene-2-pentanone and (b) at least about 4 molecular equivalents of an aqueous solution of an alkaline hypochlorite of at least about 15% concentration by weight and a pH of at least about 12 and a feed temperature not higher than about 15° C.;

maintaining the temperature in the reaction zone at about 80 to 100° C.; continuously withdrawing the thus formed product solution and isolating therefrom a member of the group consisting of α-ethylcinnamic acid and its salts.

2. A process as in claim 1 wherein an emulsifying agent is incorporated into the reaction mixture.

3. A process as in claim 1 wherein the reaction zone is vertically elongated and the reaction mixture is fed in at a lower point and the product solution is withdrawn at a higher point in said zone.

4. A process as in claim 1 wherein the temperature in the reaction zone is 95 to 98° C.

5. A process as in claim 1 wherein the residence time of the reactants in the reaction zone is about 5 to 35 minutes.

6. A process as in claim 1 wherein the alkali hypochlorite is sodium hypochlorite.

7. A process as in claim 1 wherein the product is sodium α-ethylcinnamate.

8. A process as in claim 1 wherein the product is α-ethylcinnamic acid.

References Cited in the file of this patent

UNITED STATES PATENTS 276,888    Rudolph _____ May 1, 1883